United States Patent
Freynhofer et al.

(10) Patent No.: US 6,799,961 B1
(45) Date of Patent: Oct. 5, 2004

(54) DEVICE FOR ADJUSTING A GAP

(75) Inventors: Albrecht Freynhofer, Schiffweiler (DE); Helmut Kremp, Illingen (DE); Dieter Mathieu, Ottweiler (DE); Wolfgang Rasp, Homburg (DE)

(73) Assignee: Trespaphan GmbH (DE)

( * ) Notice: Subject to any disclaimer, the term of this patent is extended or adjusted under 35 U.S.C. 154(b) by 0 days.

(21) Appl. No.: 09/857,357

(22) PCT Filed: Nov. 30, 1999

(86) PCT No.: PCT/EP99/09310

§ 371 (c)(1),
(2), (4) Date: Jul. 10, 2001

(87) PCT Pub. No.: WO00/32375

PCT Pub. Date: Jun. 8, 2000

(30) Foreign Application Priority Data

Dec. 3, 1998 (DE) .......................... 198 55 751

(51) Int. Cl.[7] .............................................. B29C 47/16
(52) U.S. Cl. ................... 425/141; 425/192 R; 425/381; 425/465; 425/466
(58) Field of Search ............................ 264/40.1, 176.1; 425/141, 192 R, 381, 465, 466

(56) References Cited

U.S. PATENT DOCUMENTS

| | | | | |
|---|---|---|---|---|
| 4,753,587 A | * | 6/1988 | Djordjevic et al. | 425/466 |
| 4,781,562 A | | 11/1988 | Sano et al. | |
| 5,020,984 A | * | 6/1991 | Cloeren et al. | 264/40.1 |
| 5,259,747 A | * | 11/1993 | Cloeren | 425/141 |
| 5,626,888 A | * | 5/1997 | Sanze et al. | 425/141 |
| 6,019,924 A | * | 2/2000 | Montalbano | 264/176.1 |

FOREIGN PATENT DOCUMENTS

| | | |
|---|---|---|
| DE | 37 31961 A 1 | 4/1989 |
| DE | 38 34719 A 1 | 4/1990 |

* cited by examiner

Primary Examiner—Robert Davis
Assistant Examiner—Joseph S. Del Sole
(74) Attorney, Agent, or Firm—Dickinson Wright PLLC

(57) ABSTRACT

The application relates to a device for adjusting the gap of a die arrangement using a thermopin, which is connected to the die lip (10) without any play by means of a clamp-type socket (7), where the clamp-type socket (7) engages on the one had in a lip nose (11) and on the other hand in a groove (5) of the thermopin (1), where the lip nose (11) is an integral part of the die lip (10) and the clamp-type socket (7) has a bore (8), and the thermopin (1) has a bore (4) and a fixing means is passed through the bores (8) and (4).

17 Claims, 4 Drawing Sheets

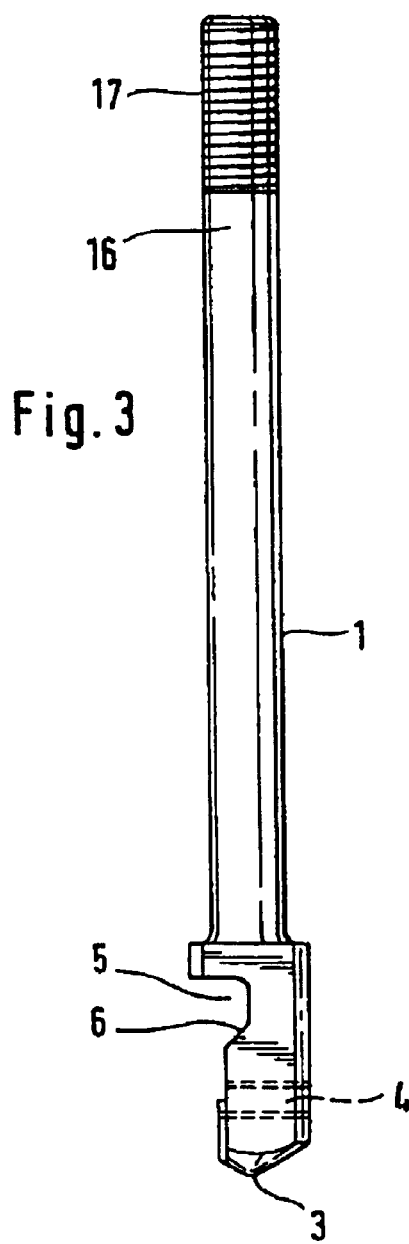
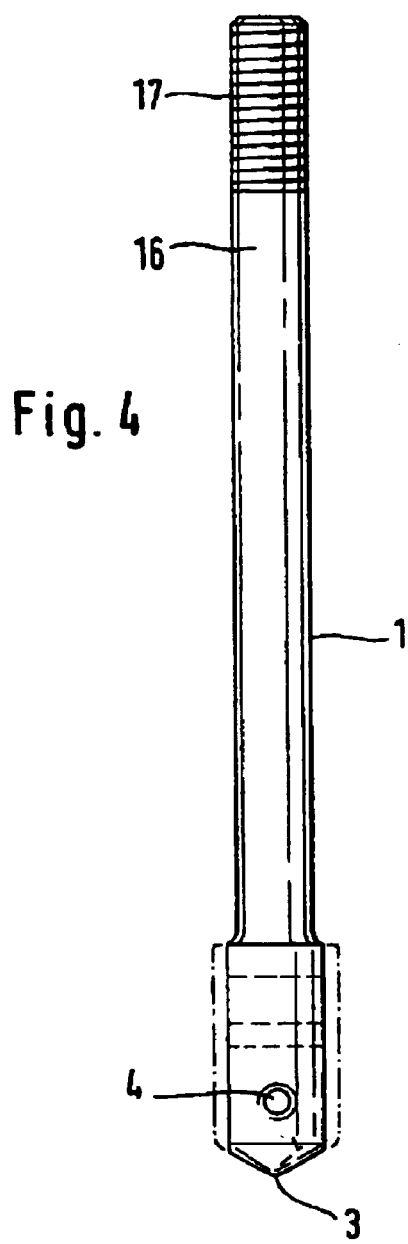
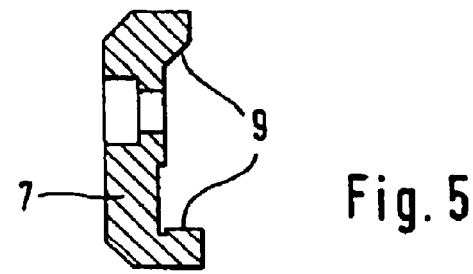
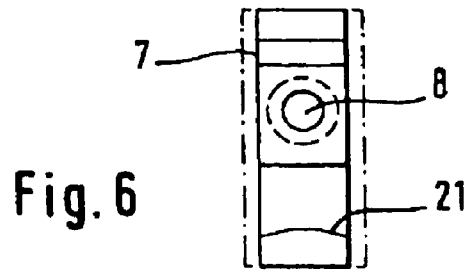

DEVICE FOR ADJUSTING A GAP

BACKGROUND OF THE INVENTION

The invention relates to a device for adjusting the gap of a die arrangement using a thermopin (1), in which the thermopin is connected to the die lip (10) without any play.

In the production of films, tapes, sheets and similar two-dimensional, continuously shaped extrudates of thermoplastics, a plastic melt is generally extruded through a slot die to give a surface having a rectangular cross section. It is important here to set a controlled thickness profile of the extrudate by adjusting the die gap. The thickness profile is important for subsequent process steps, such as, for example, the stacking of sheets, the winding of film webs or, for example, the stretching of films, the thermoforming of sheets, etc. For stretched films in particular, a uniform thickness profile of the final film over the entire width depends on the thickness profile of the precursor film.

It is known to adjust the height of the die gap or its profile by bending the die lip. The fine adjustment is frequently carried out by means of so-called thermopins. These thermopins expand on heating and exert a mechanical force on the die lip, causing the latter to deform. Conversely, the thermopin contracts on cooling, causing tension on the die lip at the corresponding point and thus an increase in the die gap.

For precise adjustment of the die gap by means of thermopins, it is important that the thermopin is connected to the die lip without any play. If there is excessive play, the heating or cooling of the thermopin in some cases does not result in deformation of the lip, but instead the change in the length of the thermopin is partly lost in the play of the arrangement and has no effect. Thermopins therefore have to act on the die lip as directly as possible and without any play.

Known play-free die arrangements with thermopins are afflicted by the disadvantage that they do not facilitate simple exchange of individual thermopins. DE 38 34 719 describes a device which has a bore in a die projection, this die projection being an integral part of the die. This connection mechanism may be damaged in operation and may wear. Deficiencies of this type cannot be eliminated since the die projection is an integral part of the die lip. The known device results in premature unusability of the entire die. Furthermore, die deformation by means of a connection mechanism of this type is not sufficiently precise, since the integral die projection results in a stiffening of the die lip.

BRIEF SUMMARY OF THE INVENTION

The object of the present invention was therefore to provide a device for adjusting the gap of a die using thermopins which ensures easy removability of individual thermopins and a play-free connection between the thermopins and the die lip and facilitates precise deformation of the die lip using thermopins.

This object is achieved in accordance with the invention by a device for adjusting the gap of a die arrangement using a thermopin, in which the thermopin is connected to the die lip (10) without any play and this play-free fixing of the thermopin (1) to the die lip (10) is effected by means of a clamp-type socket (7), where the clamp-type socket (7) engages on the one hand in a lip nose (11) and on the other hand in a groove (5) of the thermopin (1), where the lip nose (11) is an integral part of the die lip (10) and the clamp-type socket (7) has a bore (8) and the thermopin (1) has a bore (4) and a fixing means is passed through the bores (8) and (4).

BRIEF DESCRIPTION OF THE SEVERAL VIEWS OF THE DRAWING

The sub-claims define preferred embodiments of the device.

The invention is explained below with reference to the embodiments shown in the drawings. The figures are explained hereafter.

FIG. 3 shows a side view of the thermopin.

FIG. 4 shows a front view of the thermopin.

FIG. 5 shows a side cross-sectional view of the clamp-type socket.

FIG. 6 shows a front view of the clamp-type socket.

DETAILED DESCRIPTION OF THE INVENTION

Figure 1:
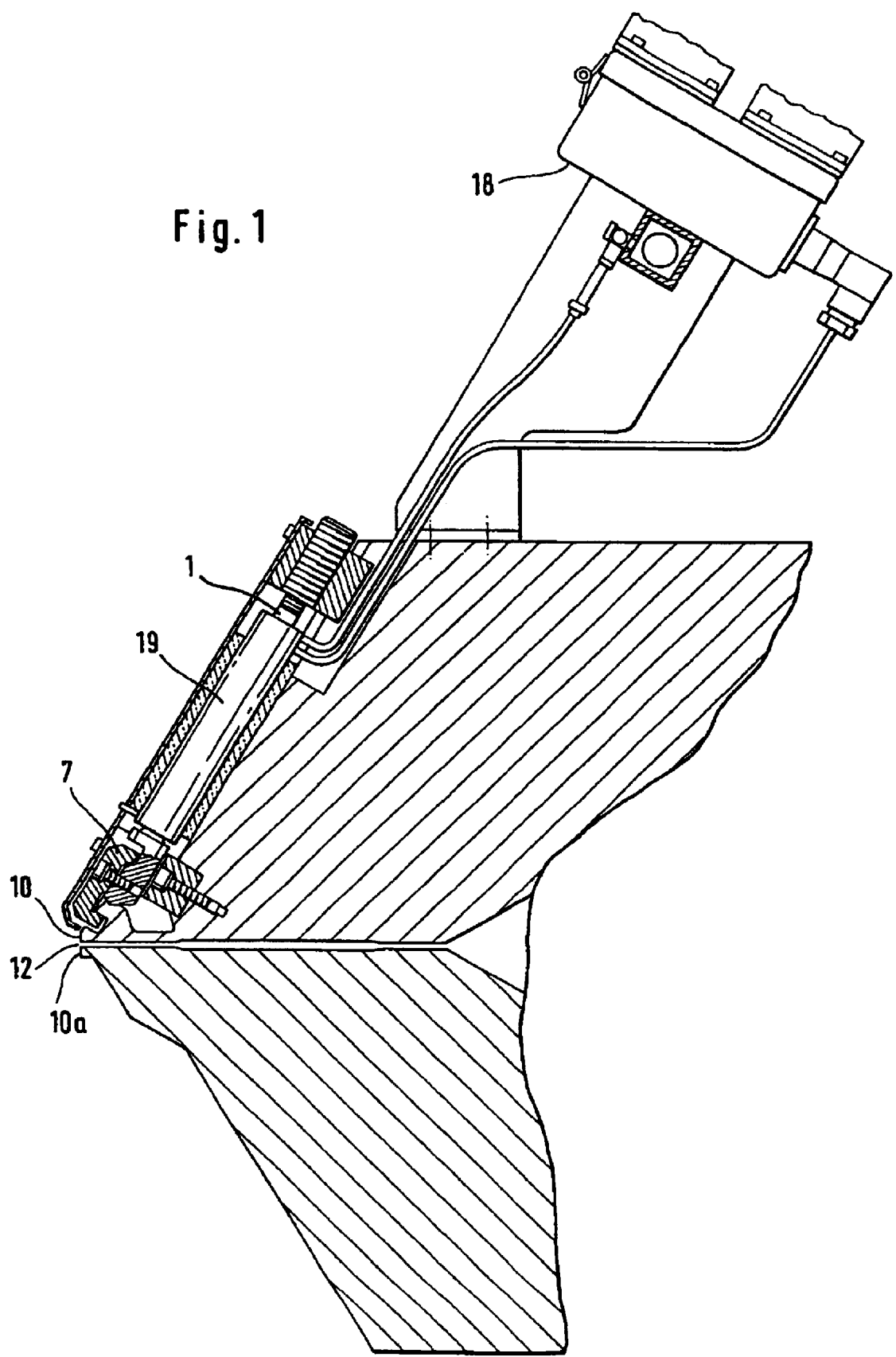
FIG. 1 shows a diagrammatic cross-sectional view of the die arrangement 30 according to the invention transverse to the longitudinal direction of the slot die [lacuna] the entire device consisting of die (10 and 10a), thermopin (1), clamp-type socket (7), coil-type heating/cooling cartridge (19) and terminal box (18).
Figure 2:
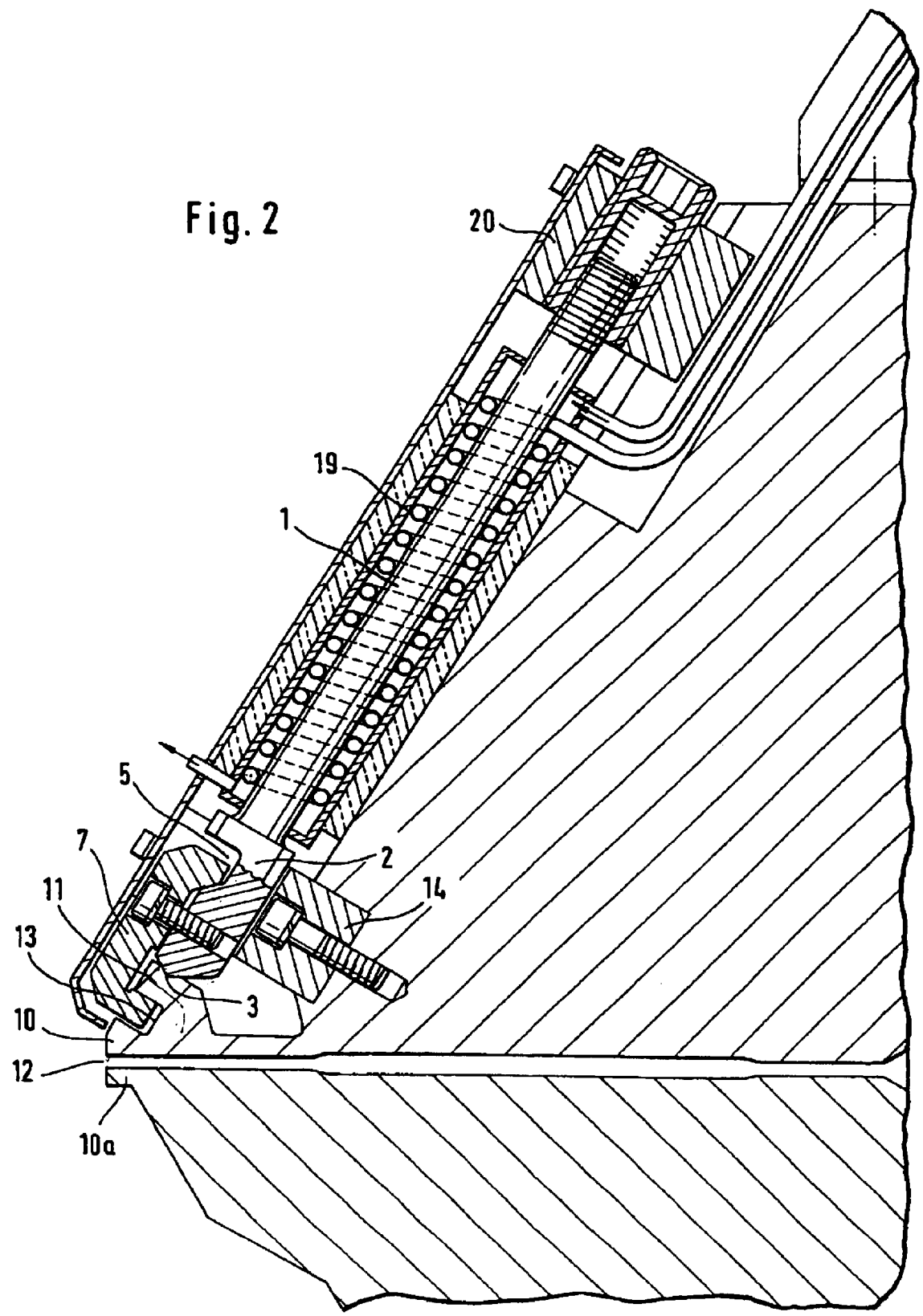
FIG. 2 shows a cross-sectional view of the thermopin with coil-type heating-cooling cartridge fixed to the die lip.

FIG. 2 shows the cross section of an adjustment system arrangement. A die lip (10) and a lower die lip (10a) form a die gap (12), whose height can be adjusted with the aid of a thermopin (1). An integral lip nose (11) with groove (13) in the direction of the die gap opening is mounted on the die lip (10). The lip nose (11) includes a plurality of slots (11a) defined therein, the intervals between said slots corresponding to the intervals of the thermopins (1). The thermopin (1) is fixed to the die lip (10) at the lip nose (11) by means of a removable clamp-type socket (7). The thermopin (1) has at the lower end (2), i.e., the end facing the die lip (10), a shape which enables the thermopin (1) to be fixed without any play to the lip nose (11) of the die lip (10) by means of the clamp-type socket (7). The shape of the lower end of the thermopin (2) is shown separately in FIG. 3 and is characterized by the following three preferred features:

1. The lower end of the thermopin (2), which is in contact with the lip nose (11) and exerts pressure on the die lip (10) via the lip nose (11) on expansion of the thermopin (1), tapers off and preferably terminates in a pointed tip (3), which ensures a minimal contact area between the thermopin (1) and the lip nose (11).
2. A bore (4) is provided above the tapered end, optionally with internal thread, by means of which a detachable fixing means, such as, for example, a screw or a bolt, can be attached.
3. A groove (5), preferably with a planar surface (6) running at an angle to the orientation of the thermopin (1), is provided above the bore (4) and achieves a non-positive connection between the clamp-type socket (7) and the thermopin (1).

The removal clamp-type socket (7) is shown in FIGS. 5 and 6 and has a shape with precisely fitting surfaces (9), which ensure a non-positive connection firstly with the inclined groove (5) of the thermopin, in particular with the planar surface (6) of the groove (5), and secondly with the groove (13) of the lip nose (11). The clamp-type socket (7) additionally has a bore (8), through which a fixing means is passed and which lines up with the bore (4) of the thermopin (1).

In order to fix the thermopin (1) to the die lip (10), the thermopin (1) is placed on the lip nose (11) in such a way that the groove (5) of the thermopin (1) is oriented in the direction of the die gap opening, i.e., to the front. The clamp-type socket (7) is inserted into the groove (13) of the lip nose (11) and into the groove (5) of the thermopin (1) and is fixed by means of a screw or equivalent fixing means, the fixing means being passed through the bore (8) of the clamp-type socket (7) and through the bore (4) of the thermopin (1) and fixed. The clamp-type socket (7) pulls the thermopin (1) downwards, i.e., in the direction of the lip nose (11), so that the thermopin (1) finally sits firmly on the lip nose (11) through its tapered tip (3) and is connected without any play to the lip nose (11) by means of the clamp-type socket.

Figure 7:
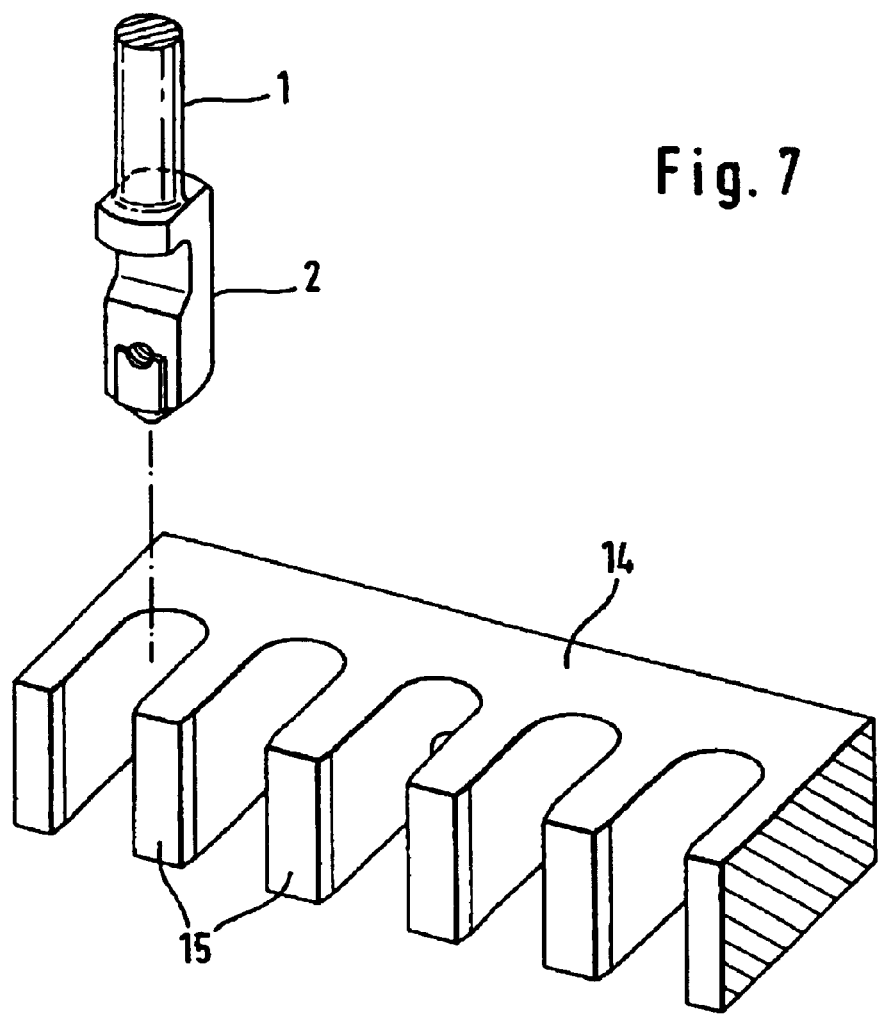
FIG. 7 shows a view of the comb strip with the thermopin.
Figure 8:
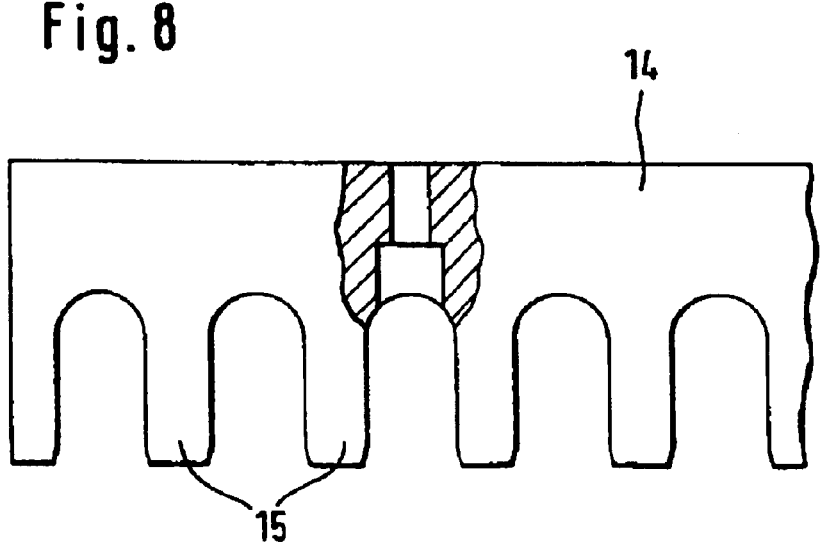
FIG. 8 shows a plan view of the clamp strip with partial longitudinal section.

The tapered shape of the lower end of the thermopin (2) means that the individual thermopins (1) are at no point lined up flush against one another. An interspace, which does not occur in known arrangements, is formed between the individual thermopins (1). For example, the claws in DE 38 34 719 are flush against one another. The interspace of the device according to the invention can result in the thermopins (1) rotating in an undesired manner during adjustment. Therefore, in a preferred embodiment of the device according to the invention, a comb strip (14), as shown in detail in FIG. 7, is provided, which is possibly an integral part of the die lip (10) or is preferably in the form of a separate part and is screwed to the die lip (10), as shown in FIG. 2. The comb strip (14) is aligned in such a way here that the row of teeth (15) faces the front, i.e., in the direction of the die opening. The row of teeth (15) of the comb strip (14) is shaped in such a way that the thermopins (1) are inserted with their lower ends (2) into the interspaces of the row of teeth (15) on attachment by means of the clamp-type socket (7) (FIG. 7) and, with the clamp-type sockets (7), sit in a precisely fitting manner between the individual teeth (15) of the comb strip (14). This effectively prevents rotation of the thermopins (1) during adjustment. If necessary, the rotation prevention measure can also be supported by means of a suitable shape of the lower end of the thermopin (2).

In accordance with the prior art, the thermopins sit on the die lip at constant intervals over the entire width of the die lip. Correspondingly, these embodiments require use of a comb strip which has a constant interval between the individual teeth. This interval is generally in the range from 20 to 40 mm and is preferably from 25 to 35 mm. During the investigations for the present invention, it was found that it is advantageous to arrange the thermopins at different intervals over the width of a die. The different intervals of the thermopins to one another are generally in the range from 5 to 30 mm. Correspondingly, the comb strip for this embodiment has tooth intervals matched to the spacing and physical sizes of the thermopins. It has been found that this arrangement with different intervals of the thermopins enables significantly more precise adjustment of the thickness profile over the entire film width, in particular in areas which are otherwise difficult to adjust. This inventive idea can of course advantageously be used for any device in which the die gap is set by means of several adjustment elements distributed over the width of the die.

The thermopin (1) is surrounded by a coil-type heating/cooling cartridge (19) in such a way that the thermopin (1) can be heated or cooled. The upper end of the thermopin (16), i.e., the end remote from the die lip (10), has an external thread (17). By means of this external thread (17), the thermopin (1) is connected to a horizontal retention strip (20) of the die lip (10). For manual adjustment of the thermopin, a bore with internal thread, which is in turned designed with a threaded pin as a differential screw connection, is incorporated into the retention strip (20).

This differential screw connection enables pre-adjustment of the die gap (12) by moving the thermopin (1) upwards or downwards in overall terms by screwing the differential screw connection. The fine adjustment of the die gap (12) is carried out by warming or cooling the thermopin (1). On warming, the thermopin (1) expands and exerts a pressure on the lip nose (11) and thus reduces the gap (12), i.e., on warming of the thermopin (1) the gap (12) becomes narrower at this point. Conversely, the thermopin (1) contracts on cooling and increases the die gap (12) at this point. In order to enable punctiform introduction of force into the lip nose (11) even under the action of tension, the clamp-type socket (7) is preferably designed with a chamfered claw (21).

If desired, instead of a thermopin which changes its longitudinal expansion as a function of temperature, it is also possible to employ an adjustment pin which works piezo-mechanically or magnetostrictively or is operated by electrochemical volume changes. Also conceivable are adjustment pins which are only operated mechanically and which may likewise be advantageously modified in accordance with the present invention. The pin design and fixing in accordance with the invention advantageously act in an equivalent manner.

The shaping of the thermopin (1) in accordance with the invention with a tapered, preferably pointed end (3) and the preferably chamfered claw (21) results in very precise adjustment of the die gap (12). Since the thermopin (1) only presses onto the lip nose (11) with its pointed tip (3) during warming and pulls in a punctiform manner at the lip nose (11) with the chamfered claw (21) of the clamp-type socket (7) during cooling, the effect of the adjustment of this die pin zone on the adjacent die pin zones on the left and right is greatly reduced. The die deforms in a spatially more narrowly restricted region, i.e., essentially only where the thermopin (1) acts, i.e., exerts a pressure or tension. The design according to the invention of the lower end of the thermopin (2) and of the clamp-type socket (7) is an improvement upon the prior art by facilitating a more direct and precise die gap (12) adjustment using the thermopins (1) which is improved compared with the prior art.

In order to promote this positive effect even more, the lip nose (11) may be slotted. These slots promote a narrow-band elastic line of the die lip when the thermopin (1 ) acts on the die lip (10). It is particularly favorable here for the slot intervals to correspond to the intervals of the thermopins (1).

The warming of the thermopin (1) by the coil-type heating/cooling cartridge (19) is preferably carried out by means of an electric, spirally open wound heating coil which is passed around the thermopin (1) and connected to electric supply lines, these supply lines themselves being connected to a terminal box (18). In accordance with the supply of current, the heating coil and thus the thermopin (1) are heated. The arrangement comprising thermopin (1) and heating coil is surrounded by a closed jacket and in its entirety forms a tubular heating element. The cooling of the thermopin (1) is carried out by inflow of a cooling medium, preferably air, into the free space between the heating coil and the jacket of the tubular heating element, which in turn runs, as an open spiral, parallel to the spiral of the heating coil. This arrangement in its entirety forms the coil-type heating/cooling cartridge (19). This preferred design contributes to rapid and efficient thermopin adjustment and thus to an immediate adjustment of the die gap (12).

Conventional heating/cooling devices for thermopins are designed with spirally closed wound heating coils, which heat the thermopin over the entire surface from the inside or from the outside. In this arrangement, the cooling is then carried out as indirect cooling via full-area cooling of the heating coil positioned externally. Alternatively, the cooling is carried out as direct, full-area cooling of the outside in the case of a heating coil located on the inside or direct, full-area cooling of the inside in the case of a heating coil located on the outside. The thermopin here must be designed as a hollow pin, which causes considerable mechanical weakening of the thermopin and reduces the life and load-bearing capacity of the thermopin. The coil-type heating/cooling cartridge (19) design according to the invention has the following essential advantages over the conventional thermopins:

Direct heat transfer from the coil-type heating/cooling cartridge (19) to the thermopin (1) is possible.

There is no weakening of the thermopin (1) by the hole bore, thus allowing a greater adjustment range.

Individual control of the heating and cooling is possible for each individual thermopin (1).

Both the supply lines to the heating coil and the inlet and outlet air line are preferably connected to the coil-type heating/cooling cartridge (19) via plug connections. In order to replace a thermopin (1), all connections can be detached quickly and easily. The plug connections to the heating coil and cooling lines are detached, the clamp-type socket (7) at the lower end of the thermopin (2) is detached, and the fixing to the retention strip (2) is detached. This enables the entire thermopin adjustment unit with the thermopin (1) and the coil-type heating/cooling cartridge (19) to be removed easily from the die arrangement. Time-saving replacement of individual worn parts is thus readily possible. The device according to the invention is thus extremely maintenance-friendly and enables the replacement of individual elements with extremely short production stoppages.

What is claimed is:

1. Device for adjusting the gap of a die arrangement using a thermopin, in which the thermopin is connected to the die lip (10) without any play and this play-free fixing of the thermopin (1) to the die lip (10) is effected by means of a clamp socket (7), where said clamp socket (7) engages on the one hand in a lip nose (11) and on the other hand in a groove (5) of the thermopin (1), where the lip nose (11) is an integral part of the die lip (10) and the clamp socket (7) has a mid-point and a bore (8) formed substantially in said mid-point of said clamp socket (7) and the thermopin (1) has a bore (4) and a fixing means is passed through the bores (8) and (4), said thermopin (1) having a lower end (2), said lower end (2) of said thermopin (1) that is in contact with said lip nose (11) having a taper, said taper terminating in a pointed tip (3), said thermopin bore (4) being situated between said pointed tip (3) and said groove (5).

2. Device according to claim 1, characterized in that a comb strip (14) is attached to the die lip (10), and the thermopins (1) are inserted between the individual teeth of the comb strip (14) on fixing to the die lip (10).

3. Device according to claim 2, characterized in that the comb strip (14) is a separate part which is reversibly fixed to the die lip (10).

4. Device according to claim 1, characterized in that the thermopin (1) is surrounded by a coil heating/cooling cartridge (19).

5. Device according to claim 4, characterized in that the coil-type heating/cooling cartridge warms the thermopin via an electric, spirally open wound heating coil.

6. Device according to claim 5, characterized in that the cooling of the thermopin (1) is effected by the inflow of a cooling medium into the free space between the heating coil and the jacket of the tubular heating element.

7. Device according to claim 1, characterized in that the thermopin has, at the upper end remote from the die lip, an external thread via which it is connected to a horizontal retention strip (18), the retention strip having a corresponding bore with internal thread.

8. Slot die, characterized in that said thermopin of claim 1 is fixed to the die lip (10) without any play.

9. Slot die, according to claim 8, characterized in that the lip nose (11) has slots, and intervals between these slots correspond to the intervals of the thermopins.

10. Method for adjusting the gap of a slot die, characterized in that the change in the height of the die gap is carried out using thermopins according to claim 1.

11. Device for adjusting the gap of a die arrangement using a thermopin, in which the thermopin is connected to the die lip (10) without any play and this play-free fixing of the thermopin (1) to the die lip (10) is effected by means of a clamp socket (7), where said clamp socket (7) engages on the one hand in a lip nose (11) and on the other hand in a groove (5) of the thermopin (1), where the lip nose (11) is an integral part of the die lip (10) and the clamp socket (7) has a mid-point and a bore (8) formed substantially in said mid-point of said damp socket (7) and the thermopin (1) has a bore (4) and a fixing means is passed through the bores (8) and (4).

12. Device according to claim 11, characterized in that a comb strip (14) is attached to the die lip (10), and the thermopins (1) are inserted between the individual teeth of the comb strip (14) on fixing to the die lip (10).

13. Device according to claim 11, characterized in that the comb strip (14) is a separate part which is reversibly fixed to the die lip (10).

14. Device according to claim 11, characterized in that the thermopin (1) is surrounded by a coil heating/cooling cartridge (19).

15. Device according to claim 14, characterized in that the coil-type heating/cooling cartridge warms the thermopin via an electric, spirally open wound heating coil.

16. Device according to claim 15, characterized in that the cooling of the thermopin (1) is effected by the inflow of a cooling medium into the free space between the heating coil and the jacket of the tubular heating element.

17. Device according to claim 11, characterized in that the thermopin has, at the upper end remote from the die lip, an external thread via which it is connected to a horizontal retention strip (18), the retention strip having a corresponding bore with internal thread.

* * * * *